(12) United States Patent
Bingman

(10) Patent No.: US 11,807,081 B1
(45) Date of Patent: Nov. 7, 2023

(54) TIRE GUARD DEVICE

(71) Applicant: Davy Russ Bingman, Joplin, MO (US)

(72) Inventor: Davy Russ Bingman, Joplin, MO (US)

( * ) Notice: Subject to any disclaimer, the term of this patent is extended or adjusted under 35 U.S.C. 154(b) by 0 days.

(21) Appl. No.: 18/079,120

(22) Filed: Dec. 12, 2022

(51) Int. Cl.
*B60J 11/10* (2006.01)

(52) U.S. Cl.
CPC .................................... *B60J 11/10* (2013.01)

(58) Field of Classification Search
CPC .. B60J 11/00; B60J 11/10; B60J 11/06; B62D 25/16; B62D 25/186
See application file for complete search history.

(56) References Cited

U.S. PATENT DOCUMENTS

| | | | |
|---|---|---|---|
| 2,849,045 | A | 8/1958 | Anderson |
| 6,061,974 | A * | 5/2000 | Perrigo .................. A01G 13/10 47/75 |
| 6,116,415 | A | 9/2000 | Rastelli |
| 6,520,344 | B2 | 2/2003 | Graham |
| 7,093,908 | B2 | 8/2006 | Garrett |
| 8,613,356 | B1 | 12/2013 | Ihnatisin |
| 10,131,217 | B2 | 11/2018 | Super et al. |
| 2005/0263228 | A1 | 12/2005 | Martin et al. |
| 2005/0264092 | A1 * | 12/2005 | Garrett .................. B60J 11/10 301/37.42 |
| 2007/0278846 | A1 | 12/2007 | Fleming |

FOREIGN PATENT DOCUMENTS

| | | | | |
|---|---|---|---|---|
| GB | 2338396 A | * | 12/1999 | .............. B60J 11/10 |
| SE | 540008 C2 | * | 2/2018 | |

* cited by examiner

*Primary Examiner* — Joseph D. Pape
(74) *Attorney, Agent, or Firm* — Argus Intellectual Enterprise; Jordan Sworen; Daniel Enea

(57) ABSTRACT

A device for protecting a tire affixed to a vehicle. The tire guard device includes an interlocking U-shaped guard member that forms a housing with an interior volume when connected with a second U-shaped guard member. Each guard member includes a sidewall and an open end with an exposed interface edge disposed along the sidewall, wherein the interface edges overlap to secure to enclose around the tire. An upper edge of the sidewall includes a lip that protrudes outward from the interior volume to prevent mice and other pests from accessing the tire. The sidewall includes a cutaway region on an interior side that can receive an axle extending from the tire. The cutaway region is sizable to the vehicle and allows for coverage of various vehicle and tire/wheel makes and models.

20 Claims, 7 Drawing Sheets

TIRE GUARD DEVICE

BACKGROUND OF THE INVENTION

The present invention relates to tire guards. The tire guard device comprises a pair of interlocking U-shaped guard members that form a housing with an interior volume when connected. The interior volume receives a tire while attached to a vehicle, wherein the housing encloses around the tire to prevent mice and other pests from accessing the tire.

Many people own vehicles that sit idly for weeks, months, and sometimes years at a time, such as mobile homes. Recreational vehicles, trailers, motorcycles, boats, specialty cars and the like are driven for relatively brief periods of time, such as for vacations or a weekend excursion. When these types of vehicles are not in use, they are kept for long periods of time in storage or parked in an open area. Unfortunately, if vehicles are stored in an unprotected area, the vehicle is left vulnerable to damage from exposure to pests that can access parts of the vehicle by climbing the tread of the tires. Some people store a vehicle in a protective storage facility or garage. However, this is not an option for most due to high storage costs or limited space available.

Devices exist that can form a barrier around a tire to prevent damage from UV radiation or other types of environmental factors. However, these devices do not provide customization to allow for coverage of tires and wheels are varying sizes. Additionally, these devices lack the ability to uniformly stack or nest multiple tire covers within one another. Therefore, there exists a need for a tire guard device that can enclose around a tire while providing the convenience of stackability and the customization of allowing the guard device to fit a variety of sized tires and wheels.

In light of the devices disclosed in the known art, it is submitted that the present invention substantially diverges in design elements and methods from the known art and consequently it is clear that there is a need in the art for an improvement for a tire guard device. In this regard the instant invention substantially fulfills these needs.

SUMMARY OF THE INVENTION

In view of the foregoing disadvantages inherent in the known types of tire guard devices now present in the known art, the present invention provides a new tire guard device wherein the same can be utilized for enclosing around a tire to prevent mice and other pests from accessing the tire.

It is an objective of the present invention to provide an embodiment of the tire guard device comprising a U-shaped guard member configured to removably interlock with a second U-shaped guard member to form a housing when joined. The guard member comprises a pair of parallel sidewalls connected by a rear wall at a rear end thereof. A front end of the guard member is open to receive a tire, wherein the front end of the parallel sidewalls each comprise an exposed interface edge adapted to engage with the interface edge of the second guard member to cooperatively enclose the tire.

It is another objective of the present invention to provide another embodiment of the tire guard device comprising a pair of interlocking U-shaped guard members.

It is yet another objective of the present invention to provide an embodiment of the tire guard device configured to enclose around a tire while the tire is remains connected to a vehicle.

It is another objective of the present invention to provide an embodiment of the tire guard device wherein an interior sidewall comprises a cutaway region on an interior side to permit the axle of the vehicle extending to the wheel to pass therethrough. The cutaway region is sizable to the vehicle and allows for coverage of various vehicle and tire/wheel makes and models.

It is another objective of the present invention to provide a tire guard device wherein an upper edge of the sidewall includes a lip that protrudes outward from the interior volume to prevent mice and other pests from accessing the tire.

It is yet another objective of the present invention to provide a tire guard device wherein the sidewall is shaped to provide for stacking of a plurality of guard members.

It is therefore an object of the present invention to provide a new and improved tire guard device comprising that has all of the advantages of the known art and none of the disadvantages.

Other objects, features, and advantages of the present invention will become apparent from the following detailed description taken in conjunction with the accompanying drawings.

BRIEF DESCRIPTIONS OF THE DRAWINGS

Although the characteristic features of this invention will be particularly pointed out in the claims, the invention itself and manner in which it may be made and used may be better understood after a review of the following description, taken in connection with the accompanying drawings.

DETAILED DESCRIPTION OF THE INVENTION

Reference is made herein to the attached drawings. For the purposes of presenting a brief and clear description of the present invention, the preferred embodiment will be discussed as used for enclosing around a tire to prevent mice and other pests from accessing the tire. The figures are intended for representative purposes only and should not be considered to be limiting in any respect.

Reference will now be made in detail to the exemplary embodiment (s) of the invention. References to "one embodiment," "at least one embodiment," "an embodiment," "one example," "an example," "for example," and so on indicate that the embodiment(s) or example(s) may include a feature, structure, characteristic, property, element, or limitation but that not every embodiment or example necessarily includes that feature, structure, characteristic, property, element, or limitation. Further, repeated use of the phrase "in an embodiment", "first embodiment", "second embodiment", or "third embodiment" does not necessarily refer to the same embodiment. Additionally, reference to an "device" can refer to a single guard member or more than one guard members.

Figure 1:
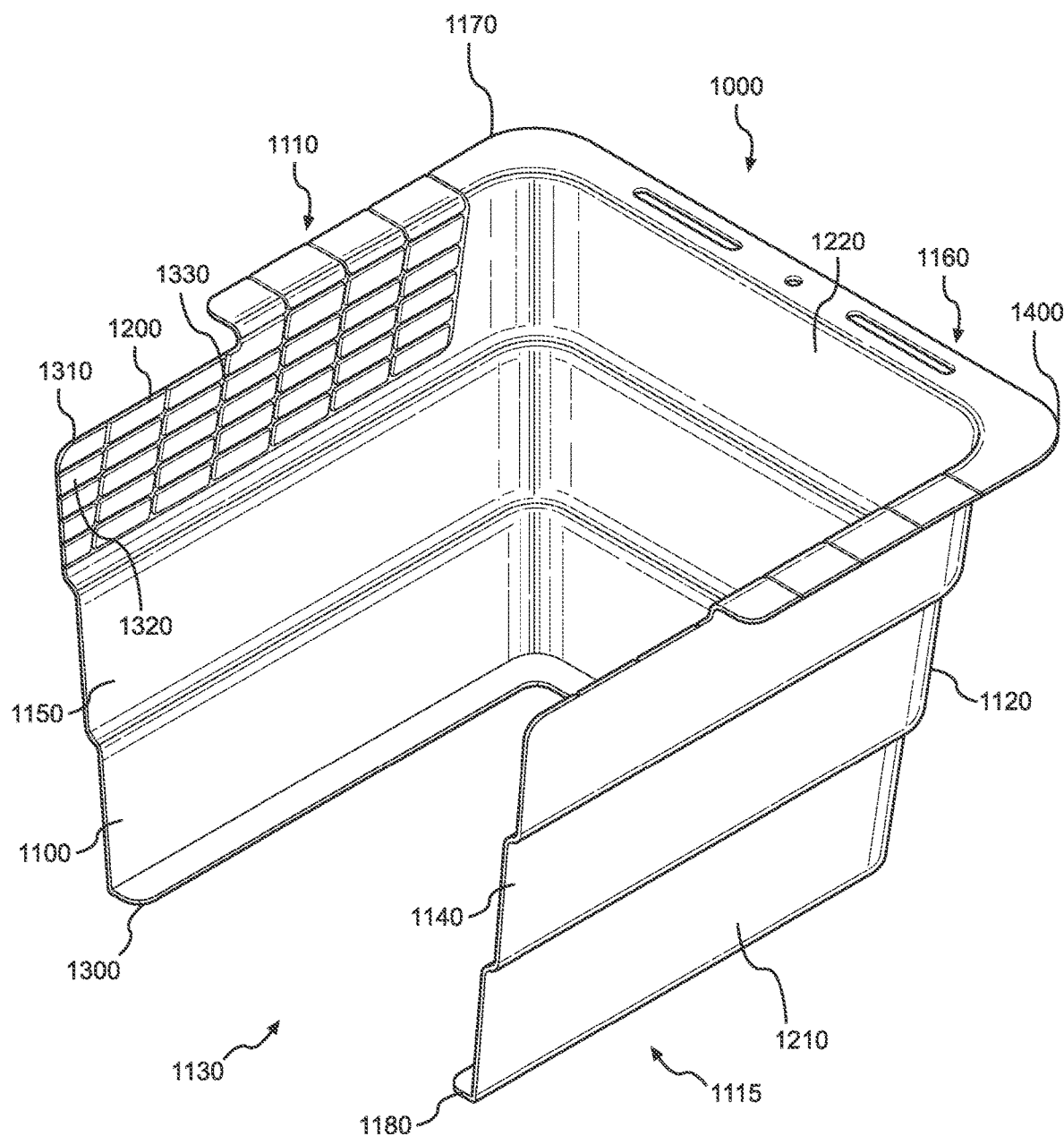
FIG. 1 shows a perspective view of an embodiment of the tire guard device.
Figure 2:
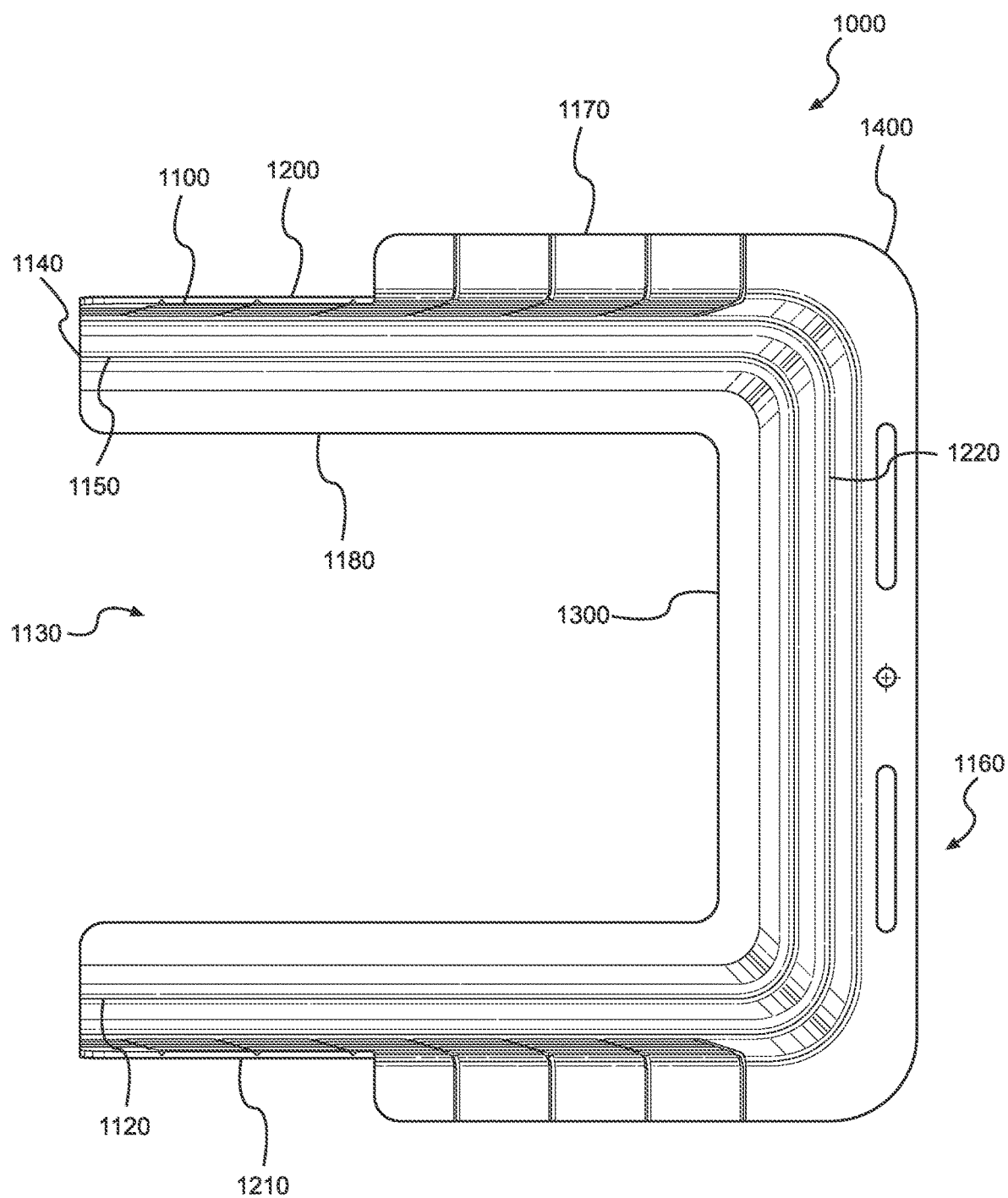
FIG. 2 shows a top planar view of an embodiment of the tire guard device.

Referring now to FIGS. 1-2, there is shown a perspective view and a top planar view of an embodiment of the tire guard device, respectively. The tire guard device 1000 comprises a U-shaped guard member 1100 configured to removably interlock with a second U-shaped guard member to form a housing adapted to enclose around a tire to prevent mice and other pests from accessing the tire. The guard member 1100 comprises at least one sidewall 1120 having an open front end 1130 with an exposed interface edge 1140 disposed along a distal end 1150 of the sidewall 1120. The exposed interface edge 1140 is adapted to engage with an interface edge of the second guard member to cooperatively enclose the tire. In other embodiments, the guard device 1000 comprises a pair of interlocking U-shaped guard members 1100. In some embodiments, the guard device 1000 comprises more than two interlocking U-shaped guard members 1100.

In the illustrated embodiment, the guard member 1100 comprises a pair of parallel sidewalls 1200, 1210 connected by a rear wall 1220 at a rear end 1160 of the guard member 1100, forming the U-shape of the guard member. In other embodiments, the walls are tapered from a distal end to a proximal end. The open front end 1130 is opposite the rear wall 1220. In the illustrated embodiment, the walls 1200, 1210, 1220 comprise a monolithic structure. In alternate embodiments, the walls are separate components connected to one another by any suitable fastener. In the illustrated embodiment, the guard member 1100 is composed of a rigid plastic configured to flex about a longitudinal axis along the interface edge, wherein the longitudinal axis is measured between an upper end 1170 and lower end 1180 of the sidewall 1120. However, in alternate embodiments, the guard member 1100 is composed of any suitable material, such as metal and the like. In the illustrated embodiment, the height of the sidewall is between 10-15 inches and the length of the sidewall and rear wall are each between 15-20 inches. However, in alternate embodiments, the height and length comprise any suitable dimension to receive a tire within an interior volume thereof.

In the illustrated embodiment, a rim 1300 extends inward from the lower end 1180 of the sidewalls 1200, 1210, wherein the rim 1300 is adapted to support the second guard member when the interface edges 1140 are joined to form the housing. The rim 1300 is also configured to provide stability to the guard member 1100 and maintain an upright configuration when placed on a ground surface. In the illustrated embodiment, the rim 1300 extends entirely around the lower end 1180 of the sidewalls and rear wall. However, in alternate embodiments, the rim extends only along the parallel sidewalls and is not included on the rear wall. The rim 1300 extends substantially perpendicular from the sidewall 1120.

In the illustrated embodiment, both the upper and lower ends 1110, 1115 of the guard members 1100 are open to allow a tire to extend beyond the upper and lower ends 1170, 1180 of the sidewall 1120. The open ends 1110, 1115 permit the tire guard device 1000 to receive and be used with tires having different size diameters. Furthermore, the upper end of the guard member 1100 comprises a length that is configured to abut an undercarriage of a vehicle when secured around the tire.

In the shown embodiment, a lip 1400 extends from the upper end 1170 of the sidewall 1120, wherein the lip 1400 protrudes outward from the interior volume 1190 to prevent mice and other pests from accessing the tire by climbing over the sidewall 1120. The lip 1400 extends the entire length of the rear wall 1220 and a partial length of the sidewalls 1200, 1210. The lip 1400 is substantially perpendicular to the walls and parallel to the rim 1300.

In the illustrated embodiment, the upper end 1170 of at least one of the sidewalls 1200, 1210 includes a cutaway region 1310 configured to be the interior sidewall that receives an axle therethrough as a result of the axle being connected to the wheel of the tire. In the illustrated embodiment, the cutaway region 1310 comprises a series framed sections 1320 outlined by a perimeter 1330 around each framed section 1320. The perimeter 1330 serves as a cutting guide by displaying identifiable sections or lines to cut along. In the illustrated embodiment, the perimeter 1330 of each framed section comprises a smaller thickness than a thickness of the framed section 1320. In this way, the perimeter 1330 provides an easier area to cut along within the cutaway region 1310. In the illustrated embodiment, the framed sections and perimeters thereof are rectangular is shape and form a grid pattern. The perimeter thickness allows each framed section to be easily removed through use of conventional shears or a cutting tool. In the illustrated embodiment, each framed section is between 0.25-2.00 inches in length and 0.25-2.00 inches in width. However, in alternate embodiments, the framed section comprises any suitable dimension intended to provide a customizable gap within the interior side to receive an axle. In this way, the cutaway region 1310 is sizable to the vehicle and allows for coverage of various vehicle and tire/wheel makes and models.

In the illustrated embodiment, the cutaway region 1310 extends to the lip 1400, wherein the perimeter 1330 of each framed section 1320 extends through a portion of the lip 1400 that extends partially along the sidewalls 1200, 1210 and is aligned therewith. This allows the removal of sections of the lip 1400 formed between the perimeter of each framed section. In the illustrated embodiment, only the interior side of one of the sidewalls comprises a cutaway region 1310, whereas in some embodiments (as seen in FIG. 7), both sidewalls 1200, 1210 comprise a cutaway region disposed at an upper end thereof.

Figure 3:
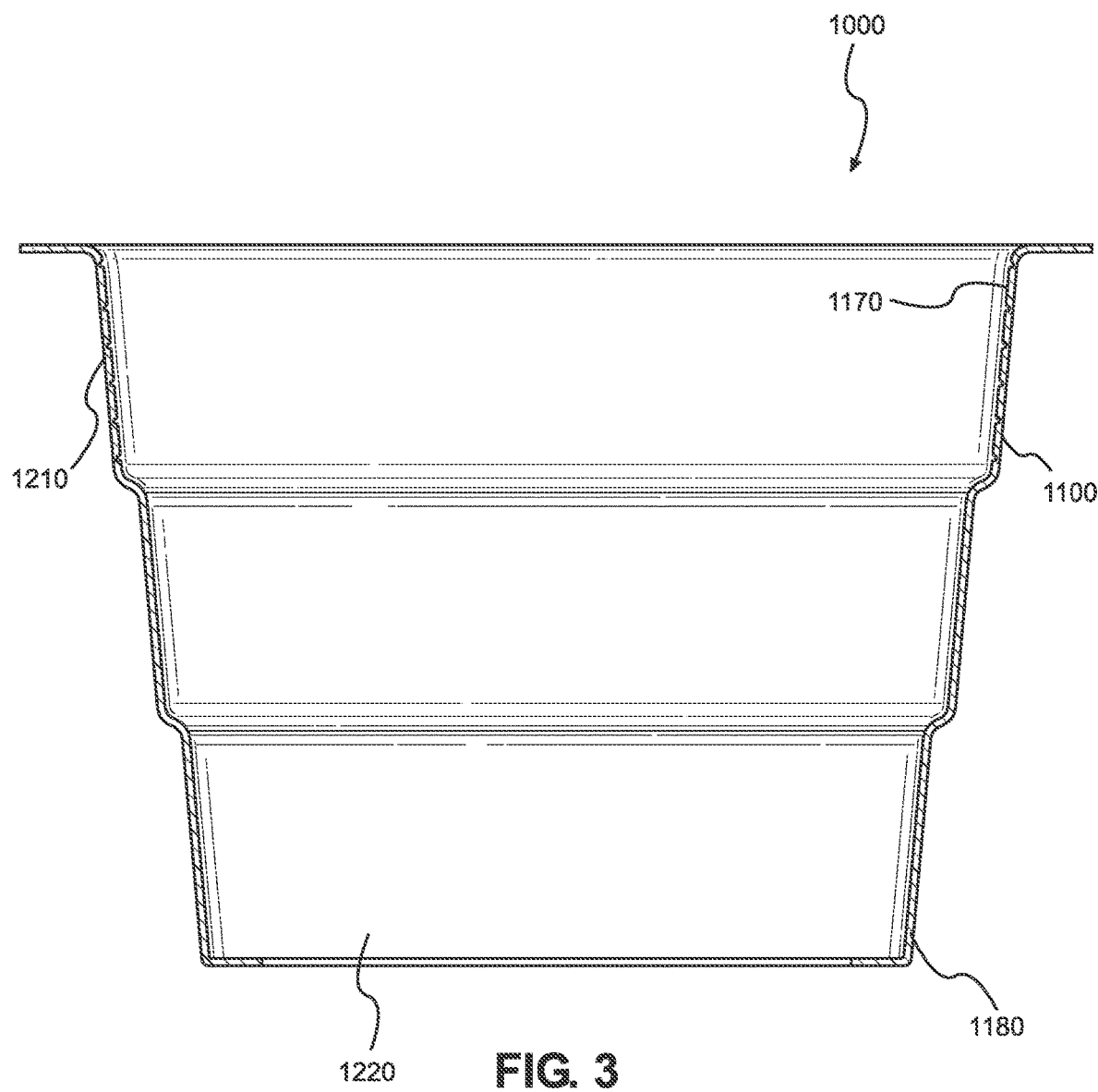
FIG. 3 shows a rear view of an embodiment of the tire guard device.
Figure 4:
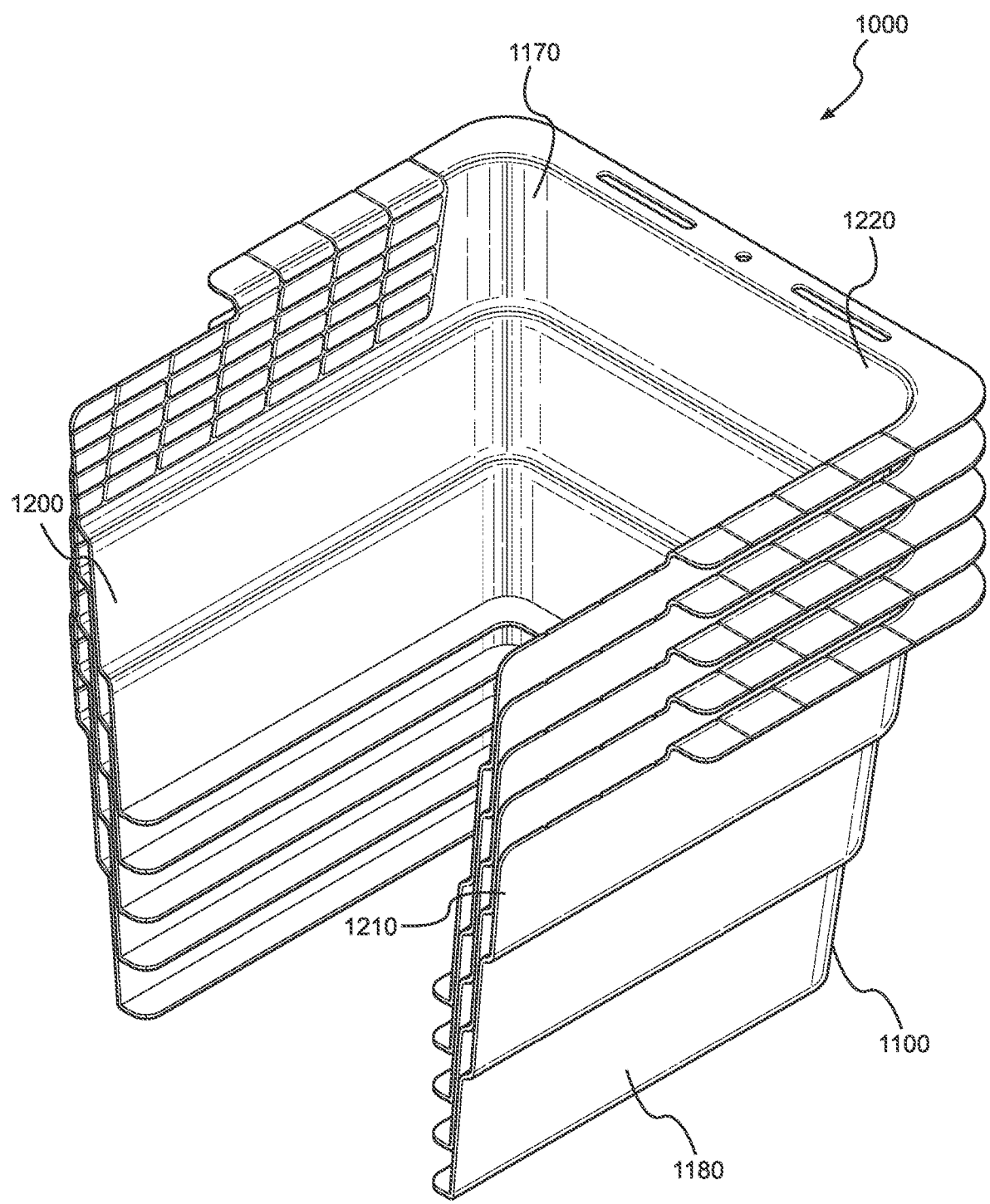
FIG. 4 shows a perspective view of a multiple guard members of the tire guard device in a stacked configuration.

Referring now to FIGS. 3-4, there is shown rear view of an embodiment of the tire guard device and a perspective view of a multiple guard members of the tire guard device in a stacked configuration, respectively. In the illustrated embodiment, the tire guard device 1000 is configured to allow nesting or stackability of a plurality of guard members 1100. The nesting allows for easy storage of the guard members 1100 when not in use, which is beneficial due to multiple tires to be protected on each vehicle. In the illustrated embodiment, the walls 1200, 1210, 1220 of the guard members 1100 are tapered at a staggering interval from the upper end 1170 to the lower end 1180, such that substantially similar guard member may be nested therein. In the shown embodiment, walls 1200, 1210, 1220 comprise a three-tiered taper, wherein the widest tiered taper is closest to the upper end and the narrowest tiered taper is proximate to the lower end. The tiered and staggered shape of the walls allow for additional support to another guard member 1100 when stacked therein. The tiered shape also assists to prevent rodents from scaling the sidewalls to access the tire. In some embodiments, the walls comprise a uniform taper that narrows towards the lower end.

Figure 5:
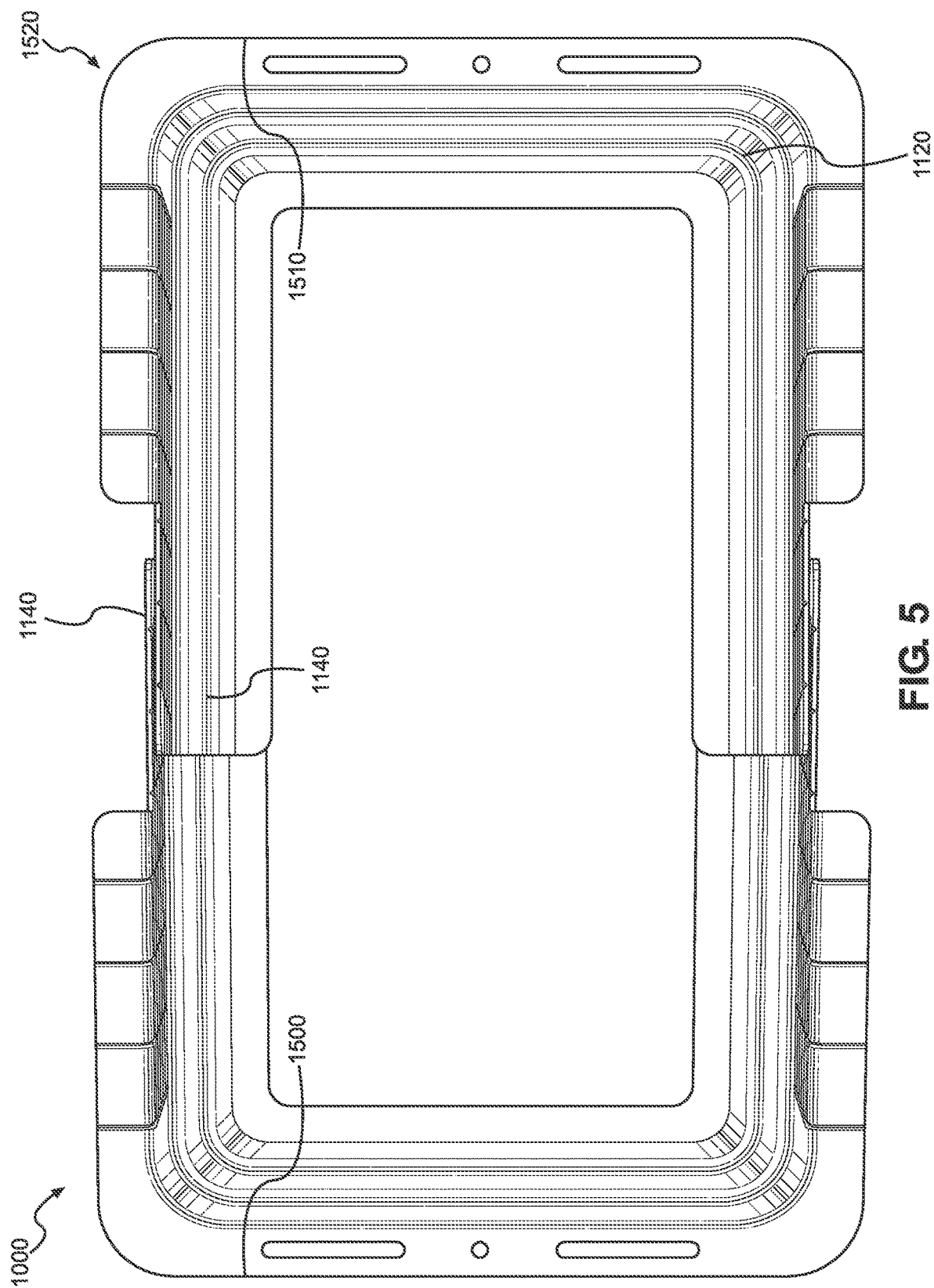
FIG. 5 shows a top planar view of an embodiment of the tire guard device in an assembled configuration.
Figure 6:
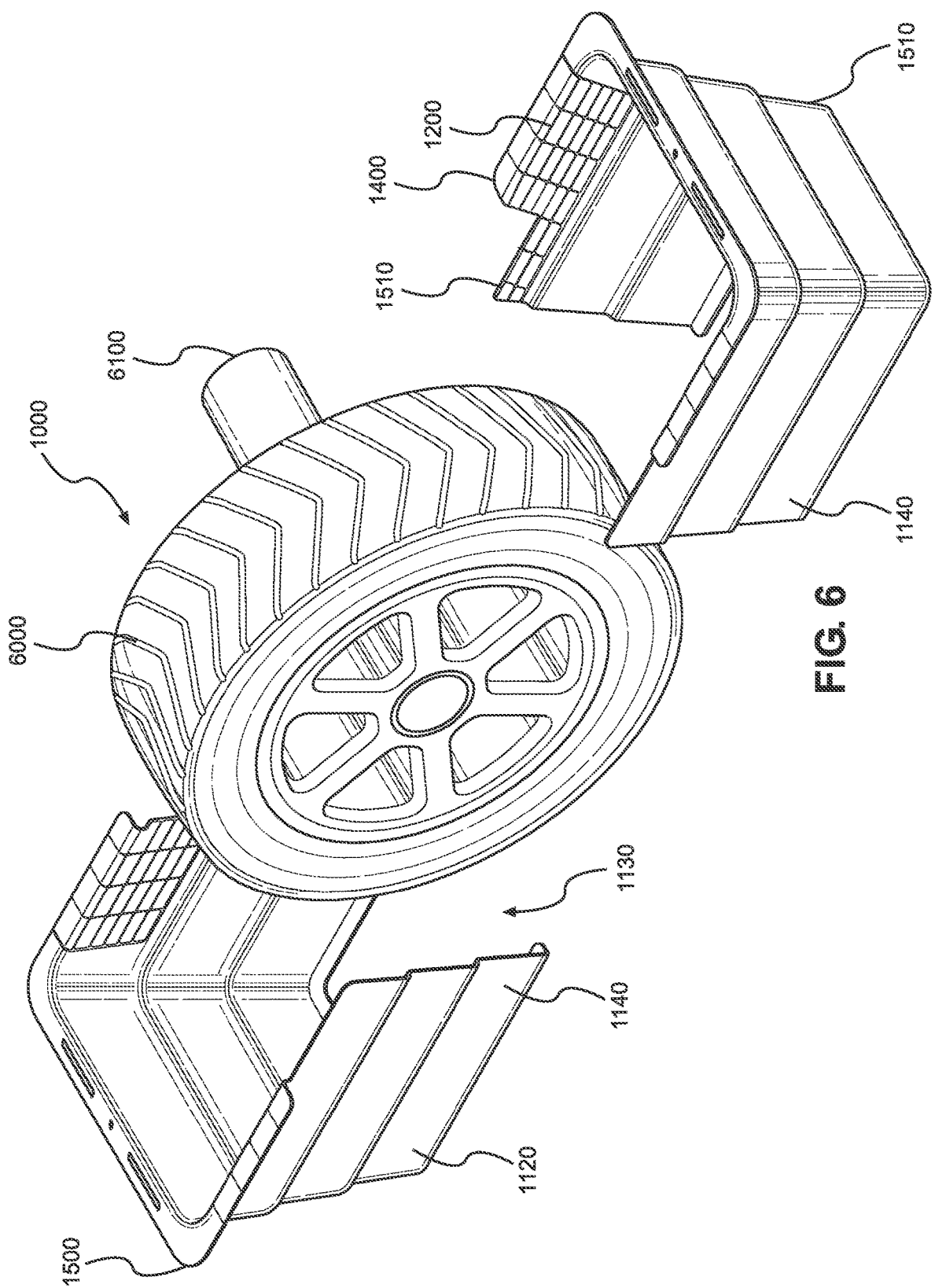
FIG. 6 shows an exploded view of an embodiment of the tire guard device.
Figure 7:
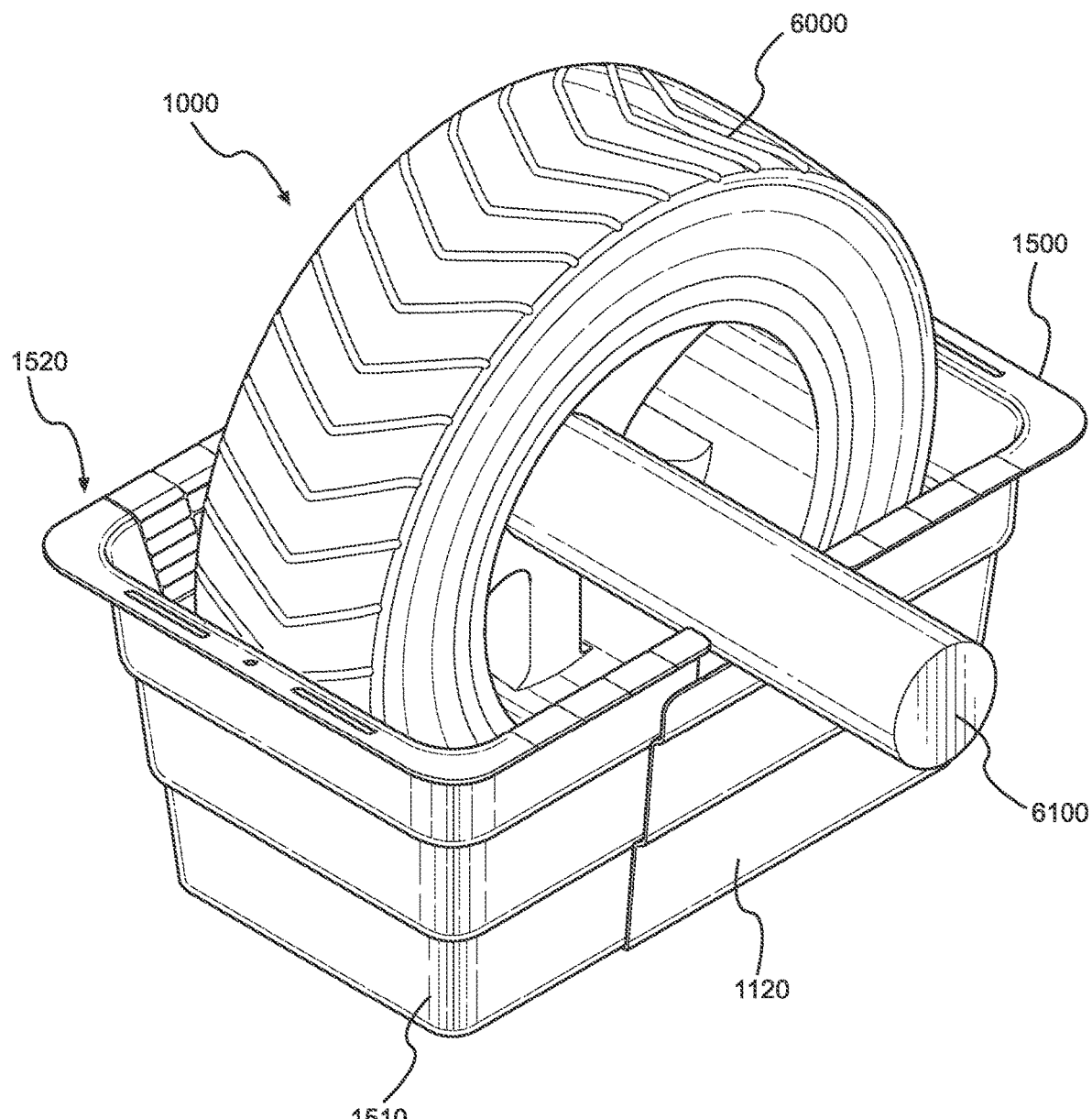
FIG. 7 shows a perspective view of an embodiment of the tire guard device in use.

Referring now to FIGS. 5-7, there is shown a top planar view of an embodiment of the tire guard device in an assembled configuration, an exploded view of an embodiment of the tire guard device, and a perspective view of an embodiment of the tire guard device in use, respectively. In the illustrated embodiment, the tire guard device 1000 comprises a first guard member 1500 and a second guard member 1510 configured to removably interlock with one another via a friction fit. The interface edge 1140 of each guard member extends between 1 to 10 inches from the distal end of the sidewall 1120 such that a corresponding interface edge 1140 of the opposing guard member 1510 is configured to overlap therewith to form the housing 1520. The amount of overlap between the interface edges 1140 of each guard member is dependent on the diameter of the tire housed therebetween. The length of the interface edges 1140 also allow the tire guard device 1000 to house a variety of tires having different diameters. For example, when the tire comprises a larger diameter, the overlap will be smaller than a tire having a smaller diameter, wherein the overlap will be larger. The overlap is defined herein as the distance that the interface edge of the first guard member extends over or is coplanar with the corresponding interface edge of the second guard member when the housing is formed.

In the illustrated embodiment, each guard member 1500, 1510 is flexible along the interface edge 1140 to allow the pair of guard members to secure together via the friction fit. However, in alternate embodiments, any suitable fastener is used to secure the first guard member to the second guard member. In the illustrated embodiment, the first guard member 1500 mirrors the exact shape and configuration of the second guard member 1510. In other embodiments, the guard members are symmetric to allow every and each guard member to be used on any side of the tire or vehicle.

In operation, a user determines how many framed sections will need to be removed from the cutaway region 1310 on the interior sidewall 1200 to receive the axle 6100 therethrough such that the tire 6000 can be entirely encircled by the housing 1520 and the upper end of the housing 1520 is configured to abut the undercarriage of the vehicle. Portions of the lip 1400 that extend along the interior sidewall are removed as needed. The interface edges 1140 of the second guard member 1510 are slightly flexed inward toward the interior volume and positioned through the open front end 1130 of the first guard member 1500. Once the interface edges 1140 overlap with one another, the user releases the second guard member 1510 to allow the exterior of the interface edges 1140 thereof to flex outwards and rest flush against an interior of the interface edges 1140 of the first guard member 1500. The tire 6000 is configured to be positioned within the housing 1520 such that the diameter thereof extends between the rear walls 1220 of each guard member 1500, 1510.

It is therefore submitted that the instant invention has been shown and described in what is considered to be the most practical and preferred embodiments. It is recognized, however, that departures may be made within the scope of the invention and that obvious modifications will occur to a person skilled in the art. With respect to the above description then, it is to be realized that the optimum dimensional relationships for the parts of the invention, to include variations in size, materials, shape, form, function and manner of operation, device and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A tire guard device, comprising:
   a pair of U-shaped guard members configured to removably interlock with one another to form a housing when joined;
   wherein each guard member comprises an exterior sidewall, an interior sidewall, an open upper end, an open lower end, a rear wall between the exterior and interior sidewalls, and an open end opposite the rear wall;
   an exposed interface edge disposed along a distal end of each of the exterior and interior sidewalls;
   wherein the interface edge of the first guard member is adapted to engage with the interface edge of the second guard member to cooperatively enclose the tire;
   wherein the exterior sidewall of each guard member is positioned along an exterior sidewall of the tire in an in-use configuration when enclosing the tire and the interior sidewall of each guard member is positioned along an interior sidewall of the tire in an in-use configuration when enclosing the tire;
   wherein interface edges are configured to overlap with one another to form the housing.

2. The tire guard device of claim 1, wherein the interface edge extends at least one inch from the distal end of the sidewall.

3. The tire guard device of claim 2, wherein each guard member is flexible along the interface edge to allow the pair of guard members to secure together via a friction fit.

4. The tire guard device of claim 1, wherein each guard member is configured to abut or fit beneath an undercarriage of the vehicle when secured around the tire.

5. The tire guard device of claim 1, further comprising a lip extending substantially perpendicular from an upper end of the sidewalls and rear wall, wherein the lip protrudes outward from the interior volume to prevent mice and other pests from accessing the tire.

6. The tire guard device of claim 5, wherein the sidewalls are parallel to each other and the lip comprises a series of perforations along at least one of the parallel sidewalls forming a plurality of removable sections to allow a gap for receiving an axle therethrough.

7. The tire guard device of claim 1, further comprising a cutaway region on at least one of the sidewalls, wherein the cutaway region comprises a series of apertures forming a plurality of framed sections within the sidewall such that each framed section is removable from the sidewall with a cutting tool to form a gap for receiving an axle therethrough.

8. The tire guard device of claim 1, wherein an interior volume of the first guard member is configured to receive the second guard member in a stacked configuration.

9. The tire guard device of claim 8, wherein the sidewalls and rear wall are each tapered at a staggering interval from an upper end to a lower end.

10. The tire guard device of claim 1, further comprising a rim extending inward from a lower end of the sidewalls, wherein the rim is adapted to support the second guard member when the interface edges are joined to form the housing.

11. A tire guard device, comprising:
    a U-shaped guard member configured to removably interlock with a second U-shaped guard member to form a housing when joined;

wherein the guard member comprises a pair of sidewalls, an open upper end, an open lower end, a rear wall between the sidewalls, and an open end opposite the rear wall;

wherein the sidewalls and rear wall are each tapered at a staggering interval from an upper end to a lower end;

an exposed interface edge disposed along a distal end of each of the sidewalls, wherein the interface edge is adapted to engage with an interface edge of the second guard member to cooperatively enclose a tire.

12. The tire guard device of claim 11, wherein the interface edge extends at least one inch from the distal end of the sidewall.

13. The tire guard device of claim 12, wherein the guard member is flexible along the interface edge.

14. The tire guard device of claim 11, further comprising a lip extending substantially perpendicular from an upper end of the sidewalls and rear wall, wherein the lip protrudes outward from the interior volume to prevent mice and other pests from accessing the tire.

15. The tire guard device of claim 14, wherein the sidewalls are parallel and the lip comprises a series of perforations along at least one of the parallel sidewalls forming a plurality of removable sections to allow a gap for receiving an axle therethrough.

16. The tire guard device of claim 11, further comprising a cutaway region on at least one of the sidewalls, wherein the cutaway region comprises a series of apertures forming a plurality of framed sections within the sidewall such that each framed section is removable from the sidewall with a cutting tool to form a gap for receiving an axle therethrough.

17. The tire guard device of claim 11, wherein an interior volume of the guard member is configured to receive the second guard member in a stacked configuration.

18. The tire guard device of claim 1, further comprising a rim extending inward from a lower end of the sidewalls, wherein the rim is adapted to support the second guard member when the interface edges are joined to form the housing.

19. A tire guard device, comprising:

a U-shaped guard member configured to removably interlock with a second U-shaped guard member to form a housing when joined;

wherein the guard member comprises a pair of sidewalls, a rear wall between the sidewalls, and an open end opposite the rear wall;

an exposed interface edge disposed along a distal end of each of the sidewalls, wherein the interface edge is adapted to engage with an interface edge of the second guard member to cooperatively enclose a tire;

a lip extending substantially perpendicular from an upper end of the sidewalls and rear wall, wherein the lip protrudes outward from the interior volume to prevent mice and other pests from accessing the tire;

wherein the sidewalls are substantially parallel and the lip comprises a series of perforations along at least one of the parallel sidewalls forming a plurality of removable sections to allow a gap for receiving an axle therethrough.

20. The tire guard device of claim 1, wherein the pair of guard members are substantially identical in shape.

* * * * *